(12) United States Patent
Meissner et al.

(10) Patent No.: US 8,498,418 B2
(45) Date of Patent: Jul. 30, 2013

(54) CONVERSION OF CRYPTOGRAPHIC KEY PROTECTION

(75) Inventors: Klaus Meissner, Boeblingen (DE); Bernd Nerz, Boeblingen (DE); Phil C. Yeh, Poughkeepsie, NY (US); Peter G. Sutton, Poughkeepsie, NY (US); Michael J. Kelly, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 12/550,667

(22) Filed: Aug. 31, 2009

(65) Prior Publication Data

US 2011/0055560 A1 Mar. 3, 2011

(51) Int. Cl.
*H04L 29/06* (2006.01)

(52) U.S. Cl.
USPC ........... 380/277; 380/278; 380/279; 380/281; 380/282; 380/286; 713/194

(58) Field of Classification Search
None
See application file for complete search history.

(56) References Cited

U.S. PATENT DOCUMENTS

| | | | |
|---|---|---|---|
| 5,164,988 A * | 11/1992 | Matyas et al. ............... | 713/156 |
| 5,991,399 A | 11/1999 | Graunke et al. | |
| 5,995,625 A | 11/1999 | Sudia et al. | |
| 6,574,733 B1 | 6/2003 | Langford | |
| 6,728,379 B1 | 4/2004 | Ishibashi et al. | |
| 6,839,437 B1 * | 1/2005 | Crane et al. ............... | 380/286 |
| 2004/0005061 A1 * | 1/2004 | Buer et al. ............... | 380/282 |
| 2004/0111631 A1 | 6/2004 | Kocher et al. | |
| 2006/0210084 A1 * | 9/2006 | Fransdonk ............... | 380/278 |
| 2006/0236127 A1 * | 10/2006 | Kurien et al. ............... | 713/193 |
| 2007/0136579 A1 * | 6/2007 | Levy et al. ............... | 713/168 |
| 2007/0220610 A1 * | 9/2007 | Van Loenen et al. ........... | 726/26 |
| 2007/0230706 A1 | 10/2007 | Youn | |
| 2008/0019526 A1 * | 1/2008 | Fu et al. ............... | 380/277 |
| 2008/0069341 A1 | 3/2008 | Relyea | |
| 2008/0080708 A1 | 4/2008 | McAlister et al. | |
| 2008/0273697 A1 | 11/2008 | Greco et al. | |

FOREIGN PATENT DOCUMENTS

| EP | 1777628 A1 | 4/2007 |
|---|---|---|
| WO | WO02093849 A3 | 11/2002 |
| WO | WO2008042175 A3 | 4/2008 |

OTHER PUBLICATIONS

"An Overview of Secret Key and Identity Management for System-on-Chip Architects," Elliptic Technologies Inc., pp. 1-8.
"z/Architecture—Principles of Operation," SA22-7832-07, Feb. 2009.
International Search Report and Written Opinion for PCT/EP2010/062362.

* cited by examiner

*Primary Examiner* — Jung Kim
*Assistant Examiner* — Adrian Stoica
(74) *Attorney, Agent, or Firm* — John E. Campbell; Blanche E. Schiller, Esq.; Heslin Rothenberg Farley & Mesiti P.C.

(57) ABSTRACT

Protection of cryptographic keys is converted between one level of security and another level of security. The one level of security is different from the another level of security, and the another level of security includes the components of the one level of security.

19 Claims, 8 Drawing Sheets

INPUT PARAMETERS

- 702 — PSMID
- 704 — ADDRESS OF COMMAND REQUEST MESSAGE
- 706 — APEX
- 708 — APQN
- 710 — K
- 712 — R
- 714 — N

OUTPUT PARAMETERS

- 722 — APQSW

CONVERSION OF CRYPTOGRAPHIC KEY PROTECTION

BACKGROUND

This invention relates, in general, to processing within a computing environment, and in particular, to providing security within the environment without significantly impacting performance.

Security within a computing environment can take many forms. One such form is the protection of cryptographic (crypto) keys. Today, various devices are available to protect these keys, such as a tamper-resistant cryptographic device.

A tamper-resistant, high-security cryptographic device (or module) supports many cryptographic algorithms or protocols and is typically attached to servers through an input/output (I/O) interface. The tamper-resistant design protects user cryptographic keys so that they never appear in the clear outside the device. The crypto operations performed by the device are thus asynchronous to the central processing units (CPUs) in the server. The device is placed within an enclosure for physical security, and therefore, the device may not be able to operate at a high frequency because of heat dispersion concerns. This type of device generally provides high security, but performance in providing cryptographic operations may be negatively impacted.

Another form of security is the protection of data, and, as an example, a cryptographic assist device is used. A crypto assist device provides high performance, but reduced security. This kind of crypto device implements cryptographic algorithms in hardware for performance, but does not provide additional means to protect user cryptographic keys. For crypto operations, the program submits cryptographic keys in the clear. Since no physical security nor tamper-resistant design is provided, this allows the algorithms, particularly the symmetric algorithms, to be easily implemented in the CPUs of the server. The crypto operations could be synchronous to the CPUs and could operate at high frequencies.

BRIEF SUMMARY

Many customers like the performance of the crypto assist device, but require the user key to be protected so that the keys will not appear in the clear outside a trusted boundary. Thus, a need exists for a capability to provide secure keys while not significantly negatively impacting performance.

The shortcomings of the prior art are overcome and additional advantages are provided through the provision of a computer program product for managing cryptographic keys. The computer program product comprises a storage medium readable by a processing circuit and storing instructions for execution by the processing circuit for performing a method. The method includes, for instance, obtaining a protected cryptographic key, the protected cryptographic key protected under one level of security; and converting protection of the protected cryptographic key between the one level of security and another level of security, the another level of security being different from the one level of security, and wherein the another level of security includes one or more components of the one level of security.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, security is provided for cryptographic keys of a computing environment without significantly impacting performance of the environment. As one example, to protect a cryptographic key encryption is employed. That is, the key is encrypted using a master key to provide an encrypted cryptographic key. The master key, and thus, the encrypted key, are protected under one level of security. In accordance with an aspect of the present invention, protection of the cryptographic key is converted from the one level of security to another level of security to enable improved performance for certain cryptographic operations using the encrypted key. For instance, the key is re-encrypted under a wrapping key (i.e., a master key) protected under another level of security and that re-encrypted key is used in the cryptographic operations.

In the embodiment described herein, the environment includes multiple levels of security, including a first level of security that provides a tamper-resistant, high security device (e.g., crypto card) for performing cryptographic operations that is very secure, but may have a negative impact on performance of the computing environment; and a second level of security that includes a trust boundary defined by policy that provides security for the cryptographic keys without significantly impacting performance. The second level of security includes, for instance, CPU internal registers, a secure hardware system area (HSA), and millicode. Millicode is licensed internal code (a.k.a., firmware) and is a part of the machine. Like microcode, millicode is an implementation of hardware. Secure HSA is a portion of HSA that is not subject to any browse or dump. The contents of CPU internal registers are encrypted when they are sent out for diagnosis reasons. Main storage locations or architecturally defined registers that are observable by programs, including the operating systems, are outside of the second level of security.

In the second level of security, which has fewer security requirements than the first level, cryptographic keys are secure in that clear values of the keys are not observable outside of the trust boundary or the second level of security. In the example herein, if a component of the computing environment is part of the first level of security, then it is also part of the second level of security (i.e., the first level is inside the boundary of the second level or the second level includes components of the first level). Therefore, the phrase "not observable outside the second level of security" indicates that the clear value of a key is not observable by components that are not part of the first level or second level of security, but is observable by components that are part of the first and second levels of security. By using the second level of security, protection is provided, but selected operations (e.g., certain crypto operations) are not hampered as with a tamper-resistant device, and therefore, can be performed more efficiently.

As stated, in one example, the conversion of protection includes converting the cryptographic keys from cryptographic keys encrypted under an internal master key of the first level of security to cryptographic keys encrypted under a wrapping key generated in the second level of security. This is accomplished by the system software (e.g., operating system) behind an encryption/decryption API invoking a new API, called Re-encipher Internal Key, to perform the conversion. The Re-encipher Internal Key API, in turn, invokes a decrypt function, which is performed inside the crypto card and produces the user crypto key in the clear. However, when the clear cryptographic key is returned in a reply queue in a secure portion of the hardware system area (HSA) in the second level of security, components within the trust boundary intercept the result and encrypt it under the appropriate wrapping key in the second level of security. The encrypted result is then placed back in the reply queue for the program to retrieve and to use to perform cryptographic operations. The clear key is not observable outside the second level of security. The system software behind the encryption/decryption API then uses the retrieved encrypted key to invoke the appropriate crypto assist encryption/decryption functions to perform the designated crypto operation.

Figure 1A:
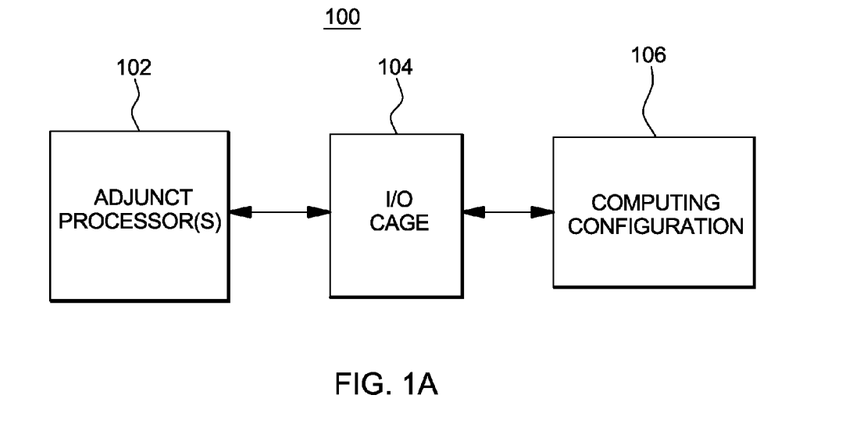
FIG. 1A depicts one example of a computing environment to incorporate and use one or more aspects of the present invention.
Figure 1B:
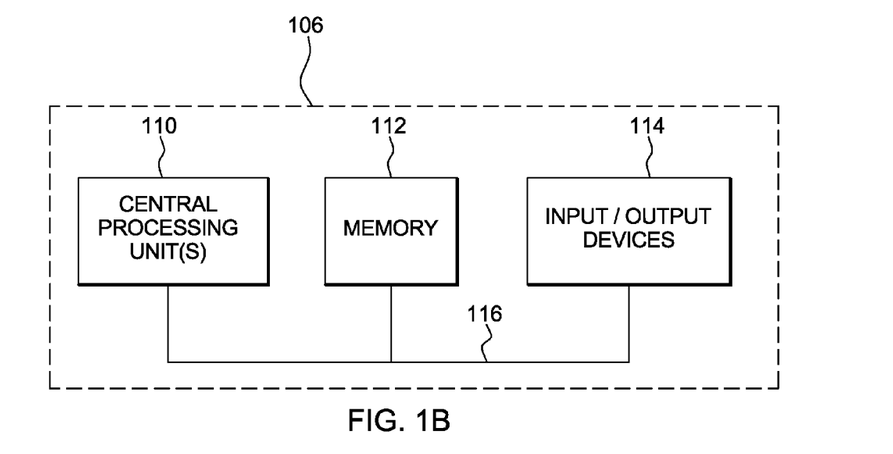
FIG. 1B depicts additional details of the computing configuration of FIG. 1A, in accordance with an aspect of the present invention.

One embodiment of a computing environment to incorporate and use one or more aspects of the present invention is described with reference to FIGS. 1A-1B. Computing environment 100 (FIG. 1A) includes, for instance, one or more adjunct processors 102 coupled to an I/O cage 104, which is further coupled to a computing configuration 106. Each adjunct processor 102 provides certain capabilities to the computing environment, such as, for instance, cryptographic operations. In one example, the adjunct processor is a tamper-resistant, high security cryptographic device (a.k.a., crypto card) that supports many algorithms or protocols. It includes multiple chips and is attached to the computing configuration through the I/O cage. As is well understood, the adjunct processor(s) and/or the I/O cage may be coupled, but separate from the computing configuration or may be integrated within the computing configuration.

As one particular example, computing configuration 106 includes one or more central processing units (CPUs) 110, a memory 112 (e.g., main memory), and one or more input/output (I/O) devices 114 coupled to one another via, for example, one or more buses 116 or other connections. In one specific implementation, each CPU 110 is a z10 CPU based on the z/Architecture® of International Business Machines Corporation, Armonk, N.Y., and one or more of the CPUs executes a control program, such as the z/OS® or z/VM® operating systems offered by International Business Machines Corporation. One example of the z/Architecture® is described in "z/Architecture-Principles of Operation," SA22-7832-07, February 2009, which is hereby incorporated herein by reference in its entirety. z/OS®, z/Architecture® and z/VM® are registered trademarks of International Business Machines Corporation, Armonk, N.Y. Other names used herein may be registered trademarks, trademarks or product names of International Business Machines Corporation or other companies.

In the above environment offered as an example, each adjunct processor 102 is a cryptographic device providing cryptographic functions to users. As part of its processing, adjunct processor 102 encrypts users' crypto keys using a master key internal to the processor. The master key is kept secret and a user's crypto key, while in the clear, is kept secure. It is not observable outside of the processor. Further, since the adjunct processor is tamper-resistant, the keys are secure even under extreme conditions. However, processing performance may be effected due to the physical features added to the processor for security and due to the asynchronous operations with respect to the CPUs. Therefore, in accordance with an aspect of the present invention, instead of the adjunct processor performing certain cryptographic functions, another component of the computing environment (e.g., millicode running on another processor (i.e., the CPU)) performs those functions to improve performance. This another component is part of a second level of security, which has fewer security requirements than the first level of security. For instance, the second level of security is not in a tamper-proof enclosure nor does it have some of the other security features (e.g., low temperature protection, electrical magnetic radiation shielding, power consumption monitoring shielding, etc.).

To perform a cryptographic function under the second level of security, the key encrypted under the master key of the adjunct processor is re-encrypted (or re-enciphered) under a wrapping key known within the second level of security, and that re-encrypted key is then used in performing the cryptographic functions. To re-encipher the key, the key is first decrypted inside the first level of security to provide a clear key that is given to the second level of security, and then the clear key is encrypted inside the second level of security under the wrapping key. The clear key is secure, however, in that it is not observable outside of the second level of security. In this particular example, no software program, including the operating system, can see the clear key (millicode can see it). That is, the clear key is not in program addressable storage (only in a secure portion of HSA).

Figure 2:
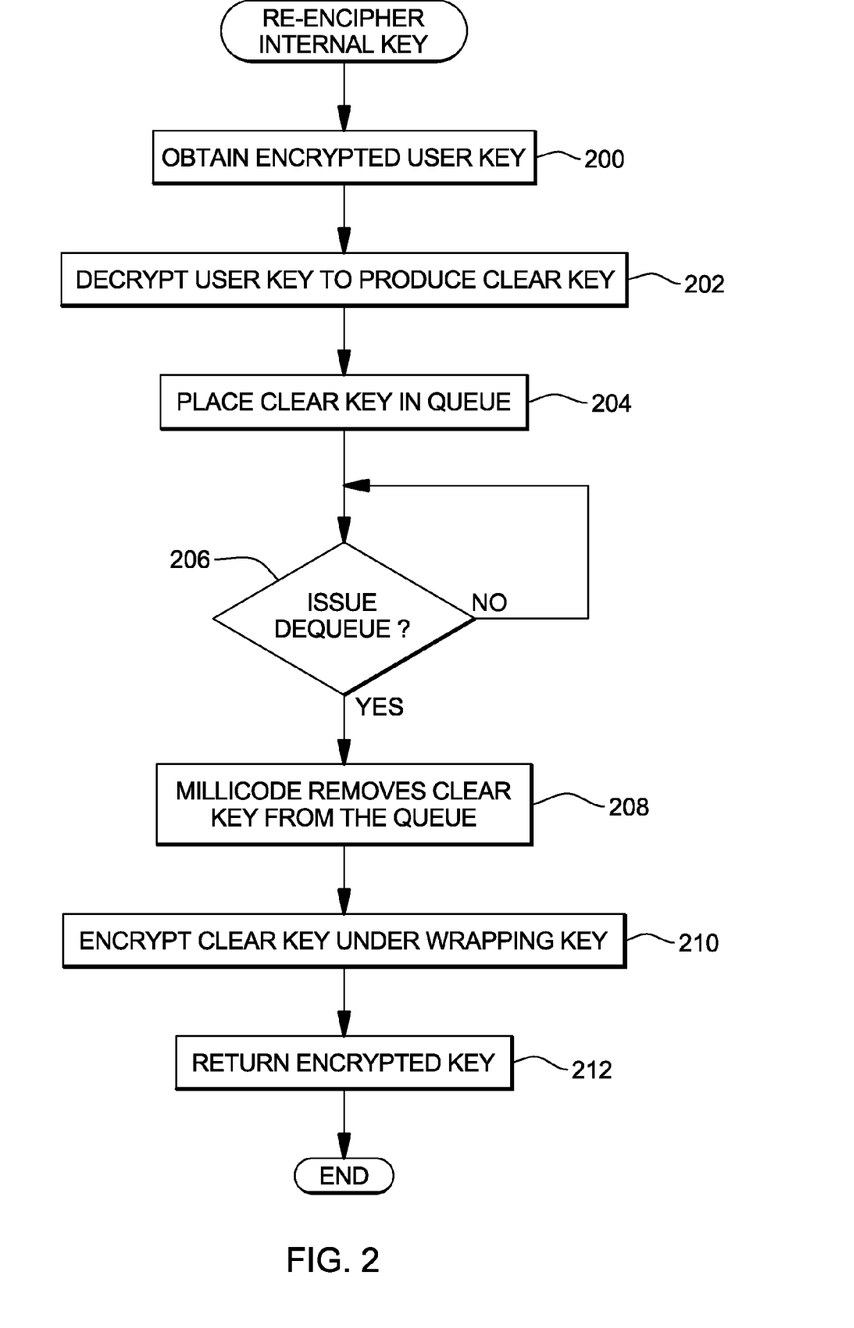
FIG. 2 depicts one example of logic to re-encipher an enciphered internal key, in accordance with an aspect of the present invention.

One embodiment of the logic to re-encipher an encrypted key is described with reference to FIG. 2. Initially, an encrypted cryptographic key is obtained, STEP 200. In one example, this user key is first encrypted by the adjunct processor under the first level of security using a master key protected under that level of security. The encrypted key is then provided to another component of the computing environment (e.g., millicode). A request is made to re-encipher the key and the key is returned to the adjunct processor, which decrypts the cryptographic key to produce a clear key, STEP 202. This clear key is provided to the millicode, but is not observable outside of the second level of security. The clear key is placed in a queue secured within the second level security, STEP 204. In one example, this queue is located in the hardware system area (HSA), which is not accessible outside of the second level security.

A determination is made as to whether it is appropriate to remove the clear key from the queue, INQUIRY 206. If it is not time to dequeue the key from the queue, then the millicode waits. However, if it is time to remove the key, then the millicode removes the clear key from the queue, STEP 208, and encrypts the clear key under a wrapping key, which is kept inside the second level of security, STEP 210. This encrypted key is then returned to the caller for use in cryptographic operations, STEP 212, as described in further detail below.

Additional details relating to one implementation of the re-encipher process are described with reference to FIG. 3. Although a specific implementation is described, many alternatives are possible without departing from the spirit of the present invention.

Figure 3:
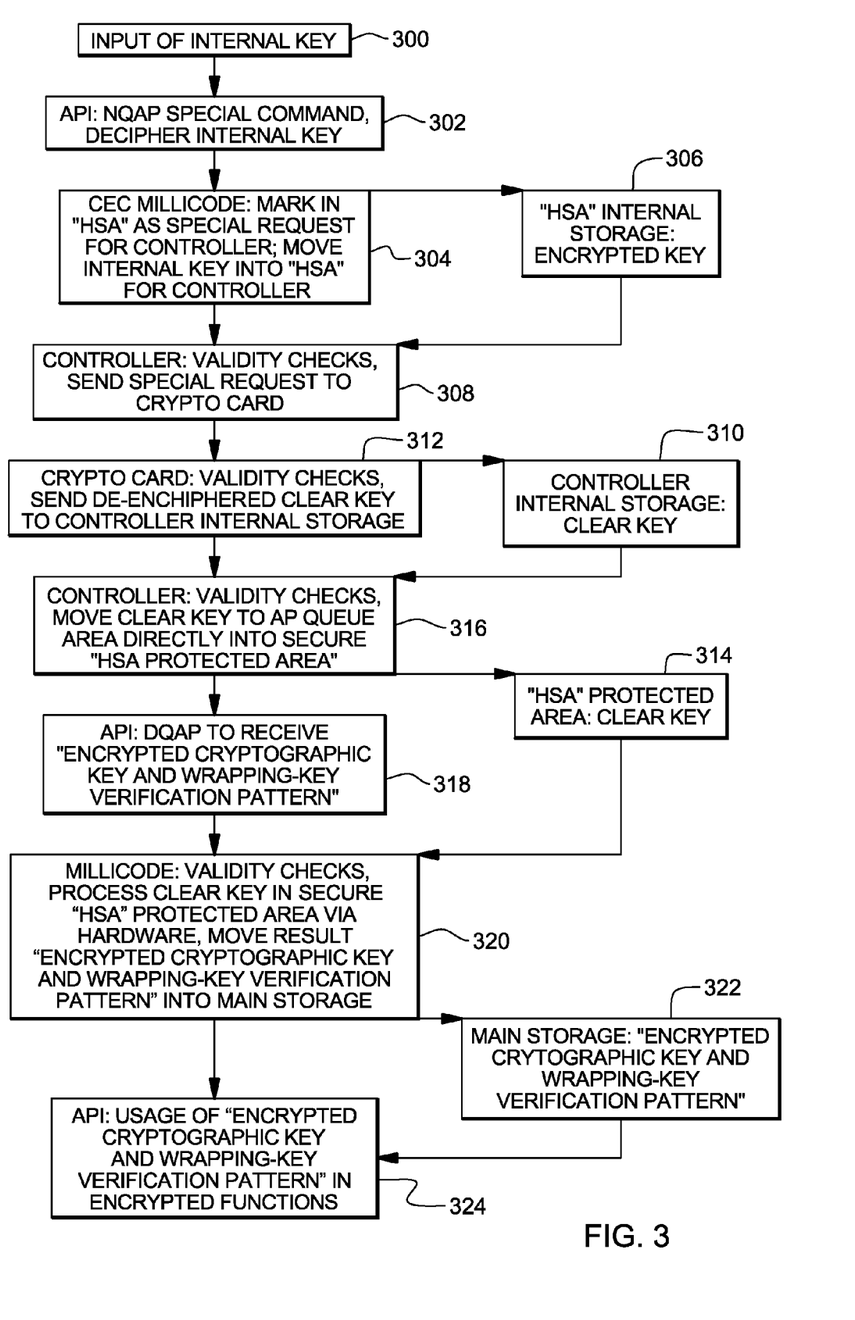
FIG. 3 depicts another example of logic to re-encipher an enciphered internal key, in accordance with an aspect of the present invention.

Referring to FIG. 3, initially, a user application commences a cryptographic function and provides a cryptographic user key for that function that has been encrypted under a master key of the adjunct processor, STEP 300. Transparent to the user application, a cryptographic subsystem of the computing environment, which in this example is part of the operating system and runs at a supervisor state, issues an enqueue adjunct processor queue (NQAP) instruction via an application programming interface (API) to re-encipher the cryptographic key, STEP 302.

The NQAP instruction has an input parameter that includes the request command message. The command message specifies a decipher internal key function. NQAP enqueues a message on a queue and the message includes the internal key, as well as data. NQAP is a means for the operating system to communicate with the adjunct processor. The message is model dependent so the message can include any desired information, including the key. In one example, when this command is issued, an indicator is set (e.g., S field of input parameter of NQAP) indicating that this is a special command. This indication for a special command is transferred to internal secure HSA memory for further usage by the adjunct processor, to enable extra security checking against the content of the message, in which a special request has to be identified by a special command code inside the command block.

Thereafter, in this particular example, the millicode (i.e., the millicode of a CPU of a central electronic complex (CEC)) examines the queue and realizes that this is a special command. Therefore, the millicode transfers the message from main storage into a queue element area in secure storage (e.g., hardware system area (HSA)), and transfers the special command indicator (e.g., S bit) into the message in HSA to indicate to a controller of the adjunct processor that this is a special command, STEP 304. Further, the internal key as part of the message is moved into HSA 306, and millicode provides a pointer to the secure HSA area for later usage by the controller to return the clear key directly to the secure area.

Subsequently, the controller performs various validity checks, and if successful, sends the special request to the adjunct processor (a.k.a., crypto card), STEP 308. For example, the controller checks if the S bit is equal to one and a special command is requested. If not, the request is rejected; otherwise, the request is sent to the adjunct processor.

In response to receiving the request, the adjunct processor also performs validity checks, STEP 312. For instance, the adjunct processor checks the validity of the input parameters, such as whether the function code is correct. If the validity checks are successful, the adjunct processor deciphers the key using an appropriate internal master key, and sends a de-enciphered clear key to the controller's internal storage 310.

In response to receiving the clear key, the controller performs other validity checks, and, if successful, moves the clear key to the secure queue area 314, STEP 316. For instance, the controller checks the return code and if it indicates success, it intercepts the result and transfers the clear key directly into the protected HSA area at the location given by the pointer defined earlier by NQAP millicode. The controller clears the clear key in the controller's internal memory, and transfers the reply message into the AP queue element message area in HSA (without any clear key). The controller marks the reply for millicode as completed in the HSA queue element area.

At a defined time, the operating system issues a dequeue adjunct processor queue (DQAP) instruction to start further processing and dequeuing of the reply, STEP 318. In one example, the defined time is determined by testing the queue via, for instance, a process adjunct processor queue (PQAP) instruction, which is executed at defined time intervals (e.g., when a timer pops). If, in one example, the test indicates the status has transitioned from test pending request to reply is ready, the DQAP instruction is issued.

DQAP millicode recognizes the reply as a special command reply indicated by the S bit placed in HSA previously by NQAP. The millicode checks the clear key in the protected area for correct key type and key length. If incorrect, DQAP rejects further processing and returns an error reply message, and clears all special command related fields in HSA, as well as the clear key in protected HSA area, STEP 320.

However, if correct, DQAP intercepts and transfers the clear key directly (does not appear in any register) into a processing area in a protected HSA area and calls a millicode subroutine. The subroutine provides the encrypted cryptographic key and the corresponding wrapping key verification pattern. In particular, the subroutine encrypts the clear key under a wrapping key. The wrapping key is generated by the millicode using a pseudo random number generator each time the configuration is IPLed and is used to re-encrypt the cryptographic keys until regenerated.

To encrypt under the wrapping key, an encipher operation is used. For example, this encryption is accomplished by invoking an existing crypto-assist (a.k.a., message security assist) encryption function which uses a clear data-encrypting key to encrypt the data. The millicode invokes this function by specifying the user clear key as data and the wrapping key as the clear data-encrypting key. The existing function takes these inputs and provides an encrypted key as output. Any encryption function will suffice. In one example, the encryption function supplied with the z/Architecture® offered by International Business Machines Corporation, Armonk, N.Y., is used. An embodiment of this function is described in "z/Architecture® Principles of Operation," IBM Publication No.

SA22-7832-07, February 2009, which is hereby incorporated herein by reference in its entirety.

Thereafter, DQAP millicode transfers the encrypted cryptographic key and wrapping key verification pattern into a key area in the AP queue element message area in HSA. Further, DQAP millicode transfers the reply message from HSA to main storage 322, and clears all special command related fields in HSA, as well as the clear key in protected HSA area.

Subsequently, the encrypted cryptographic key and wrapping key verification pattern may be used in cryptographic functions in the second level of security, STEP 324. This processing is described in further detail with reference to FIG. 4.

Figure 4:
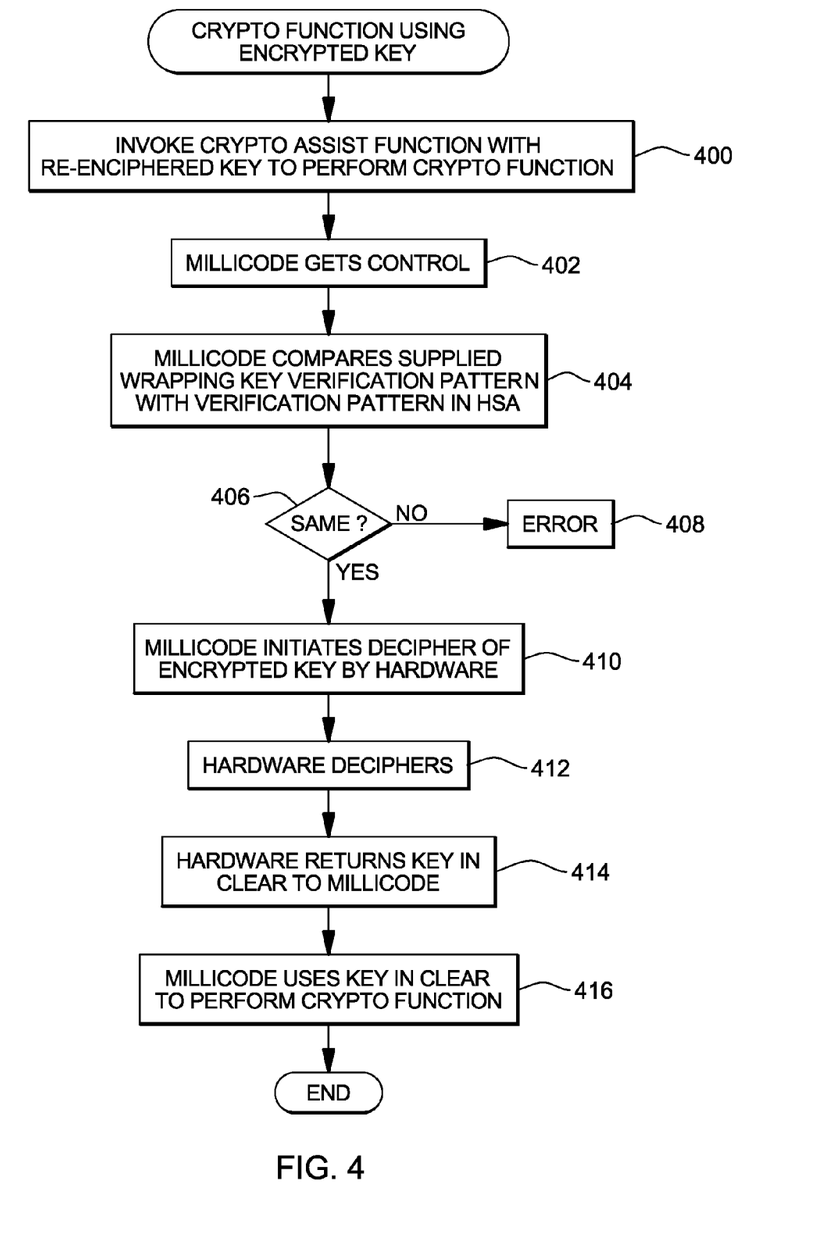
FIG. 4 depicts one embodiment of logic to use the re-enciphered key, in accordance with an aspect of the present invention.

Referring to FIG. 4, a cryptographic assist function is invoked with the key encrypted under the wrapping key to perform a cryptographic function, such as encrypt or decrypt, STEP 400. In response to invoking this function, the millicode receives control, STEP 402. The millicode compares the program supplied wrapping key verification pattern with the wrapping key verification pattern stored in HSA, STEP 404. If they are not the same, INQUIRY 406, then an error is provided, STEP 408. This error indicates that the wrapping key, which is maintained in HSA, has changed, and therefore, the process to re-encipher the internal key is to be reiterated. The wrapping key verification pattern in HSA is a pseudo random number and is changed by the millicode each time the wrapping key is changed.

However, if the supplied wrapping key verification pattern matches the verification pattern in HSA, then the millicode initiates deciphering of the encrypted user key by, for instance, hardware (e.g., crypto assist device), STEP 410. The hardware deciphers the encrypted key, STEP 412, and returns the key in the clear to the millicode, STEP 414. The millicode uses the key in the clear to perform the cryptographic function, STEP 416. Although the millicode is using the key in the clear to perform the cryptographic function, no software, including the operating system, in this example, can observe any user key in the clear. This provides a significant security enhancement over the existing crypto assist.

To decipher the key, a decipher operation is used. For example, decryption is accomplished by the millicode invoking an existing crypto-assist (a.k.a., message security assist) decryption function and specifying the encrypted key as data and the wrapping key as the decrypting key. The existing function takes these inputs and provides a clear key as output. Any decryption function will suffice. In one example, the decryption function supplied with the z/Architecture® offered by International Business Machines Corporation, Armonk, N.Y., is used. An embodiment of this function is described in "z/Architecture® Principles of Operation," IBM Publication No. SA22-7832-07, February 2009, which is hereby incorporated herein by reference in its entirety.

Referenced above are various instructions that are used to re-encipher an encrypted user key. Details of these instructions are now described with reference to the figures. In particular, the enqueue adjunct processor queue instruction is described with reference to FIGS. 5A-5B; the process adjunct processor queue instruction is described with reference to FIGS. 6A-6B; and the dequeue adjunct processor queue instruction is described with reference to FIGS. 7A-7B.

Figure 5A:
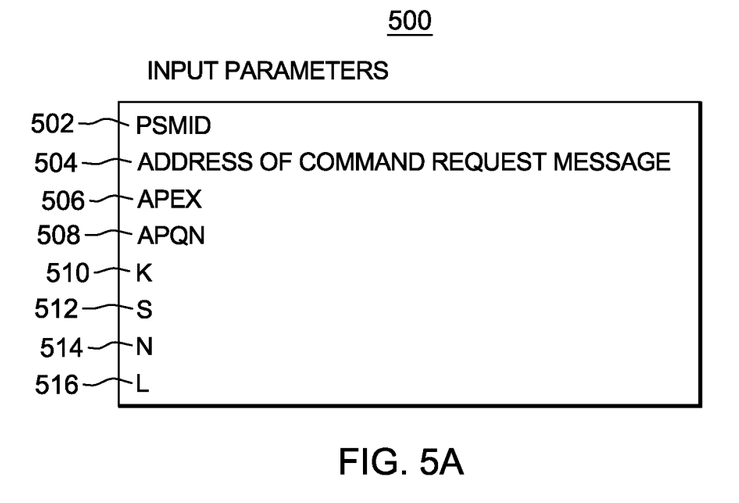
FIG. 5A depicts one example of an input parameter for an enqueue instruction, in accordance with an aspect of the present invention.
Figure 5B:
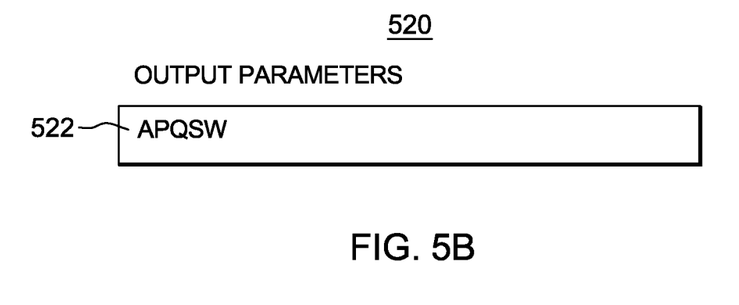
FIG. 5B depicts one example of an output parameter for the enqueue instruction of FIG. 5A, in accordance with an aspect of the present invention.

Referring initially to FIGS. 5A-5B, in one embodiment, an enqueue adjunct processor queue (NQAP) instruction receives as input an input parameter 500 (FIG. 5A) and provides as output an output parameter 520 (FIG. 5B).

In one example, input parameter 500 (FIG. 5A) includes the following parameters:

PSMID (502): This field, which is the first operand for the instruction, is called the program supplied message identifier (PSMID). When N is zero, the PSMID is stored into the PSMID field of the AP queue entry. When N is one, the first operand is ignored.

Address (504): This field provides an address of the second operand being enqueued, called the command request message.

APEX (506): The APEX field, when N is one, is a normal index that designates the AP queue entry used to enqueue the command request message part. When N is zero, APEX is ignored, and the CPU attempts to select an AP queue entry in the available state.

APQN (508): This field includes the AP queue number. There is one AP queue for the system (or for each logical partition), and there are a defined number of elements per queue (e.g., 32).

K (510): The K field specifies the storage protection key associated with the second operand.

S (512): The S field, the special command field, specifies whether or not a command is in the special command group. As an example, the decipher internal key is in the special command group. When a command in the special command group is specified, S is one. When a command not in the special command group is specified, S is zero.

N (514): The N field, the index type field, specifies whether the normal or an arbitrary index is to be used. When N is zero, an arbitrary index is designated, meaning that the CPU determines the AP queue entry index. When N is one, a normal index is designated, meaning that the APEX field contains the AP queue entry index to use.

L (516): The L field is the last part designation field. When L is zero, the AP message part is not the last part. When L is one, the AP message part is the last part and the AP queue entry enters the request pending state (QP) upon completion of the NQAP.

In execution, the first and second operands are placed in the AP queue designated by the AP queue number and AP queue entry index, provided that the queue is not full. The condition code is set to indicate the result of the action. Upon completion, the status is provided in the AP queue status word (APQSW) 522 of output parameter 520 (FIG. 5B).

Figure 6A:
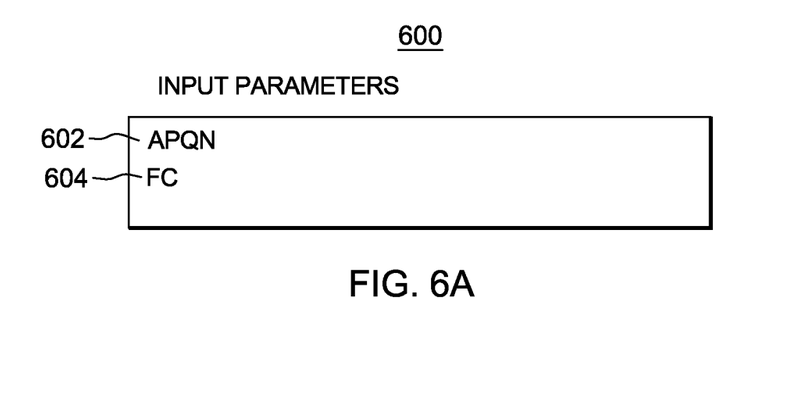
FIG. 6A depicts one example of an input parameter for a process queue instruction, in accordance with an aspect of the present invention.
Figure 6B:
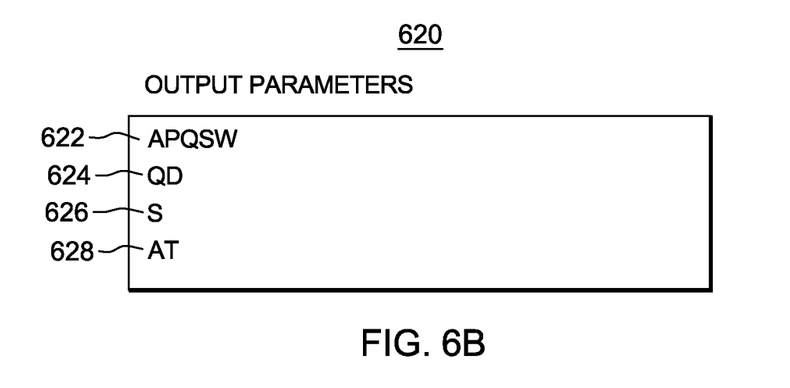
FIG. 6B depicts one example of an output parameter for the process queue instruction of FIG. 6A, in accordance with an aspect of the present invention.

Referring to FIGS. 6A-6B, in one embodiment, a process adjunct processor queue (PQAP) instruction receives as input an input parameter 600 (FIG. 6A) and provides as output an output parameter 620 (FIG. 6B).

In one example, input parameter 600 (FIG. 6A) includes the following fields:

APQN (602): This field includes the adjunct processor queue number.

FC (604): The FC field includes the function code to be performed under the process adjunct processor queue. Example function codes include a test adjunct processor queue function; a reset adjunct processor queue function; zeroize adjunct processor queue function; and an adjunct processor queue interruption control function.

In execution, the AP queue designated by the AP queue number is processed according to the specified function code. At the completion of the instruction, AP queue status word 622 (FIG. 6B) is provided. Further, if the function code specifies the test AP queue function, then the following output is also provided.

QD (624): This field includes the number of queue entries on each AP queue in the configuration. In one example, QD is a value in the range 0-31, representing the number of queue entries in the range 1-32 decimal.

S (626): When this field is one, the AP special command facility is installed and the S field of the NQAP is operative.

AT (628): This field describes the adjunct processor type.

Figure 7A:
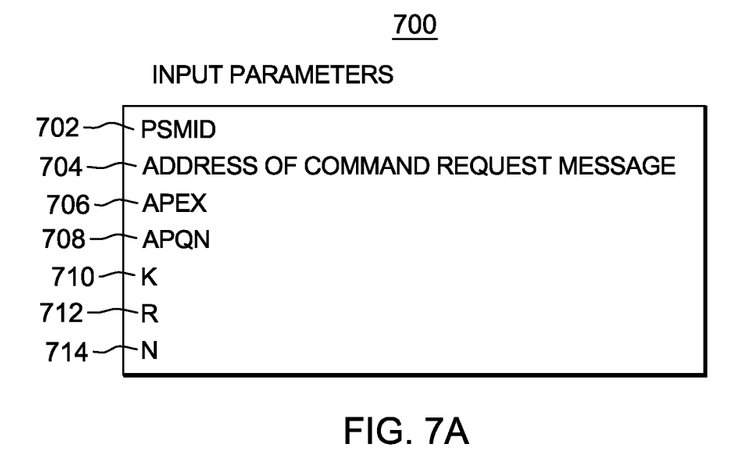
FIG. 7A depicts one example of an input parameter for a dequeue instruction, in accordance with an aspect of the present invention.
Figure 7B:
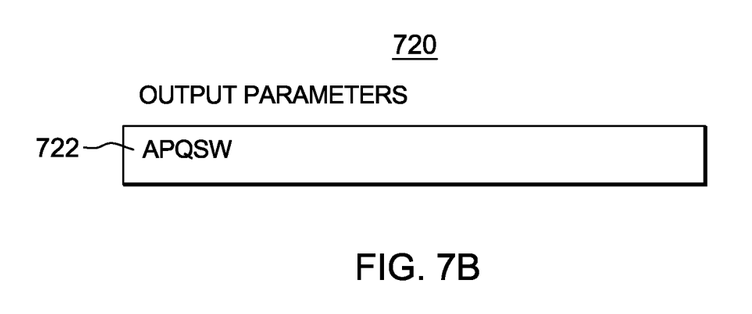
FIG. 7B depicts one example of an output parameter for the dequeue instruction of FIG. 7A, in accordance with an aspect of the present invention.

Referring to FIGS. 7A-7B, in one example, a dequeue adjunct processor (DQAP) instruction receives as input an input parameter 700 (FIG. 7A) and provides as output an output parameter 720 (FIG. 7B).

In one example, input parameter 700 (FIG. 7A) includes the following parameters:

PSMID (702): This field is set to the program supplied message identifier field of the AP queue entry.

Address (704): This field includes the logical address that designates the second operand location in main storage.

APEX (706): The APEX field, when N is one, is a normal index that designates the AP queue entry used to dequeue this part. When N is zero, APEX is ignored, and the CPU selects an entry in the reply pending state.

APQN (708): This field includes the AP queue number.

K (710): The K field specifies the storage protection key associated with the second operand.

R (712): The R field is the reset cursor field. When the original value of R is one, the cursor of the message field is set to zero prior to starting to move command reply message bytes. No special action is taken when R is zero.

N (714): The N field, the index type bit, specifies whether the normal or an arbitrary index is to be used. When N is zero, an arbitrary index is designated, meaning that the CPU determines the AP queue entry index. When N is one, a normal index is designated, meaning that the APEX field contains the AP queue entry index to use.

In execution, the AP queue designated by the AP queue number is examined for queue entries that are in the reply pending state (RP), or if N is one, that the queue entry designated by the normal index is in the partially emptied (PE) state. If a reply is found, the PSMID and reply message part are removed from the queue and placed in the first and second operand locations, respectively. The condition code is set to indicate the result of the action. Upon completion, APQSW field 722 (FIG. 7B) in output parameter 720 is set to the AP queue status word upon completion of DQAP, unless otherwise stated.

The above described instructions are used to communicate between the adjunct processor and the CPUs.

Described in detail above is an enhanced capability to protect cryptographic keys using a millicode protected security boundary. Since, in this example, the customer's requirement is to protect cryptographic keys so that the keys do not appear in the clear in program addressable storage, in accordance with an aspect of the present invention, cryptographic keys are protected by machine generated internal wrapping keys in hardware system area (HSA) addressable by millicode. This system includes a tamper-resistant crypto card and a crypto assist facility with some additional features. This hybrid system provides bulk data symmetric key crypto operations in the crypto assist using protected keys to meet the customer's security requirement. The performance for bulk-data symmetric key crypto operations is similar to that of the existing crypto assist operations using keys in the clear.

For a configuration that uses a crypto card, APIs use cryptographic keys encrypted under the crypto card master key. In this case, the system software behind some of these APIs performs an under-the-cover key conversion that converts the cryptographic key encrypted under the crypto card master key to become encrypted under the wrapping key. This conversion also returns a wrapping key verification pattern to indicate the current version of the wrapping key. The system software then issues a crypto assist function using the converted key and the wrapping key verification pattern. (Both the converted key and the wrapping key verification pattern are kept in a database by the system software for future use. This reduces unnecessary key conversion in the future.) Since bulk-data crypto operations in crypto assist is typically 100 to 1000 times faster than that in the tamper-resistant crypto card, a significant performance improvement is achieved. Also, since this key conversion and use of the crypto assist function are performed under-the-cover, there is no impact to the existing applications to receive the performance improvement.

To perform the key conversion, the system software behind those APIs issues a re-encipher internal key API, which in turn issues a decrypt internal key function with the encrypted key to the crypto card. The crypto card returns the key in the clear in an element of the reply queue in the secure HSA. When the requestor extracts the final result by executing the dequeue adjunct processor queue (DQAP) instruction, the millicode intercepts this reply and encrypts the clear key under a wrapping key. The encrypted value and the wrapping key verification pattern are returned to the requestor. The conversion of user key is thus performed in a secure and transparent fashion. The key in the clear is observable to millicode and is not observable to any program, including the operating system.

The system software maintains a copy of the user keys encrypted under the crypto card master key. When the wrapping keys are changed, the system software performs this key conversion again in a transparent fashion. Also, the system software maintains a copy of the converted user key and the wrapping key verification pattern. Subsequently, if the same user key is used, the system software simply uses the previously converted key without going through the conversion again.

For configurations that do not use a crypto card, existing APIs use user keys in the clear. A cryptographic function is provided in the crypto assist to facilitate protection of user clear keys, which include a wrapped clear key. The function takes a clear key as input and encrypts the clear key with the wrapping key.

For all existing cryptographic functions in the crypto assist that use a clear key, another version of the same function, which uses the key encrypted under an appropriate wrapping key, is provided. Each of these new functions also expects an appropriate wrapping key verification pattern as an input.

During execution of a new cryptographic function in the crypto assist, if the provided wrapping key verification pattern does not match the wrapping key verification pattern in HSA, then the operation is rejected by setting a condition code (verification pattern mismatch). If they match, then the millicode deciphers the encrypted key using the appropriate wrapping key in HSA and an existing clear key decipher function in the crypto assist to derive the user key in the clear. Then, the millicode executes the existing clear key cryptographic function that is equivalent to the new cryptographic function to obtain the final result.

Note, that, for bulk data, the program would repeatedly execute the same function until all source data have been processed. A small lookaside buffer in HSA built by millicode for user encrypted keys and the corresponding clear keys would avoid the need for deciphering the user key during subsequent executions of the function. This could produce almost the same performance for encrypted key operations as for clear key operations.

This conversion of user key protection and using the user key protected under the second level of security could be performed in system software and in a fashion transparent to applications. The existing encryption/decryption API uses a user key encrypted under the master key of the tamper-resistant crypto card (the first level of security) and the operation is currently performed in the crypto card. With one or more aspects of this invention, the system software behind the API could send the request to the crypto assist device, rather than the crypto card, to get a significant performance improvement in a transparent fashion to the applications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
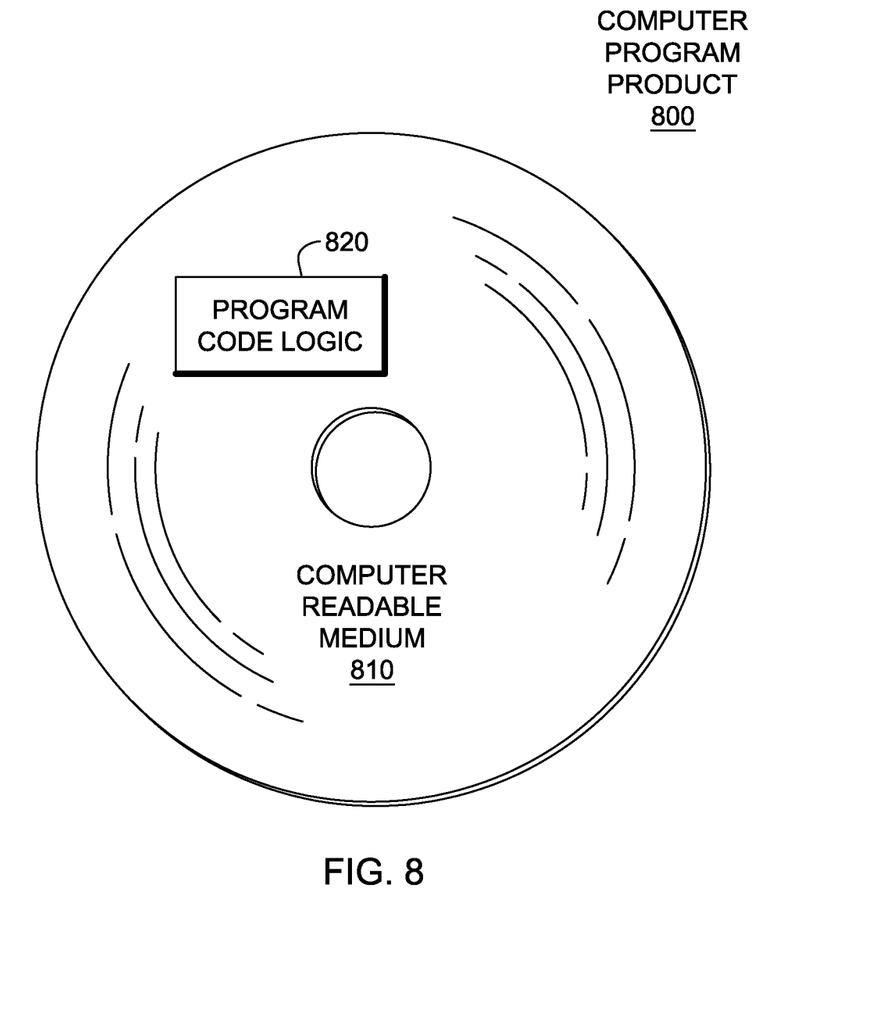
FIG. 8 depicts one embodiment of a computer program product incorporating one or more aspects of the present invention.

Referring now to FIG. 8, in one example, a computer program product 800 includes, for instance, one or more computer readable media 810 to store computer readable program code means or logic 820 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For instance, computing environments of other architectures can incorporate and use one or more aspects of the present invention. Further, different configurations are possible. For instance, in one embodiment, adjunct processors are not needed.

Yet further, even though two levels of security (a first and second) are described herein, there may be one level or more than two levels. In the multilevel example described herein, one level (e.g., the first level) has greater security than another level (e.g., the second level). In another embodiment, the one level may have less security requirements than the another level. Further, one and another can refer to levels other than the first level and second level, respectively.

Moreover, the components of each level of security may be different than described herein. For instance, the another level of security (e.g., the second level) may include the operating system or in yet a further example, an application program. In the case in which the second level of security includes the operating system, the operating system could use software crypto modules to perform the crypto operations and user keys could be in the clear inside storage protected by the operating system; no clear key would exist in any application storage.

Additionally, protection of user crypto keys may be provided without using encryption and master keys (or wrapping keys). One example is that the user crypto keys are kept inside the crypto device and never leave the device. In this case, conversion of crypto key protection could be achieved by moving a user crypto key from one device to another device without re-enciphering.

In one implementation, there are different types of cryptographic keys, and thus, a different wrapping key for each type. As an example, there are AES keys, and associated AES wrapping keys (e.g., 256 bits) and wrapping key verification patterns. As a further example, there are DEA keys and associated DEA wrapping keys (e.g., 192 bits) and wrapping key verification patterns. Other types may also exist.

Additionally, in another embodiment, the S field is not needed. This is only to enhance performance. In other embodiments, the function code is checked each time the command is issued. Yet further, the verification patterns may be eliminated. Moreover, protection of keys can be performed by means other than encryption. Many other variations can exist.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for managing cryptographic keys of a computing environment, the computer program product comprising:
a non-transitory storage medium readable by a processing circuit and storing instructions for execution by the processing circuit for performing a method comprising:
converting an encrypted cryptographic key protected under one level of security to a re-encrypted cryptographic key protected under another level of security, the one level of security provided by a tamper resistant, high security device, and the another level of security including a trust boundary defined by policy, the another level of security having fewer security requirements than the one level of security and including one or more components of the computing environment, the converting comprising:
based on a request by a user application to perform a cryptographic function, obtaining by a processor of the computing environment, the encrypted cryptographic key encrypted under the one level of security using a master key internal to the one level of security, the processor coupled to the tamper resistant, high security device;
executing, by the processor, transparent to the user application, an enqueue adjunct processor queue (NQAP) instruction to re-encipher the encrypted cryptographic key, the NQAP instruction to provide the encrypted cryptographic key to be re-encrypted, decipher command to be performed, and an indicator indicating that the decipher command to be performed is a special command;
based on executing the NQAP instruction, obtaining the encrypted cryptographic key in the clear as a clear key, the clear key placed in secure memory observable by the another level of security and not observable outside of the another level of security; and
re-encrypting, by the processor, the clear key using a wrapping key kept inside the another level of security to provide an encrypted key to be used in the cryptographic function.

2. The computer program product of claim 1, wherein the method further comprises:
retrieving by the user application the encrypted key; and
using the encrypted key to perform the cryptographic function, wherein the using invokes a cryptographic assist device to perform the cryptographic function.

3. The computer program product of claim 1, wherein the wrapping key has associated therewith a wrapping key verification pattern used in verifying validity of the encrypted key to be used in performing cryptographic functions.

4. The computer program product of claim 1, wherein the clear key is only in a secure portion of a hardware system area.

5. The computer program product of claim 1, wherein the tamper resistant, high security device comprises a cryptographic device coupled to the processor, and the method further comprises:
based on executing the NQAP instruction, sending the decipher command to the cryptographic device;
based on receiving the decipher command, decrypting by the cryptographic device the encrypted cryptographic key to produce the clear key; and
providing by the cryptographic device the clear key to the processor, wherein the clear key is secure within the another level of security.

6. The computer program product of claim 5, wherein the providing the clear key places the clear key in a queue located in a hardware system area within the another level of security.

7. The computer program product of claim 6, wherein the re-encrypting comprises:
determining whether it is appropriate to remove the clear key from the queue;
based on the determining indicating it is appropriate, removing the clear key from the queue; and
encrypting the clear key under the wrapping key kept inside the another level of security.

8. The computer program product of claim 1,
wherein the method further comprises:
based on executing the NQAP instruction, placing a message specified by the NQAP instruction that includes the decipher command and the encrypted cryptographic key to be re-enciphered on a queue in main memory;
based on determining the decipher command is a special command, transferring the message from the queue in main memory to secure storage; and
based on successful execution of one or more validity checks, sending the decipher command to the tamper resistant, high security device to decrypt the encrypted cryptographic key providing the clear key.

9. The computer program product of claim 1, wherein the method further comprises providing bulk data symmetric key cryptographic operations, using the encrypted key under the another level of security, that meets a customer's security requirements.

10. A computer system for managing cryptographic keys of a computing environment, the computer system comprising:
a memory; and
a processor in communications with the memory, wherein the computer system is configured to perform a method, said method comprising:
converting an encrypted cryptographic key protected under one level of security to a re-encrypted cryptographic key protected under another level of security, the one level of security provided by a tamper resistant, high security device, and the another level of security including a trust boundary defined by policy, the another level of security having fewer security requirements than the one level of security and including one or more components of the computing environment, the converting comprising:
based on a request by a user application to perform a cryptographic function, obtaining by a processor of the computing environment, the encrypted cryptographic key encrypted under the one level of security using a master key internal to the one level of security, the processor coupled to the tamper resistant, high security device;
executing, by the processor, transparent to the user application, an enqueue adjunct processor queue (NQAP) instruction to re-encipher the encrypted cryptographic key, the NQAP instruction to provide the encrypted cryptographic key to be re-encrypted, a decipher command to be performed, and an indicator indicating that the decipher command to be performed is a special command;
based on executing the NQAP instruction, obtaining the encrypted cryptographic key in the clear as a clear key, the clear key placed in secure memory observable by the another level of security and not observable outside of the another level of security; and re-encrypting, by the processor, the clear key using a wrapping key kept inside the another level of security to provide an encrypted key to be used in the cryptographic function.

11. The computer system of claim 10, wherein the method further comprises:
retrieving by the user application the encrypted key; and
using the encrypted key to perform the cryptographic function, wherein the using invokes a cryptographic assist device to perform the cryptographic function.

12. The computer system of claim 10, wherein the wrapping key has associated therewith a wrapping key verification pattern used in verifying validity of the encrypted key to be used in performing cryptographic functions.

13. The computer system of claim 10, wherein the tamper resistant, high security device comprises a cryptographic device coupled to the processor, and the method further comprises:
based on executing the NQAP instruction, sending the decipher command to the cryptographic device;
based on receiving the decipher command, decrypting by the cryptographic device the encrypted cryptographic key to produce the clear key; and
providing by the cryptographic device the clear key to the processor, wherein the clear key is secure within the another level of security.

14. The computer system of claim 13, wherein the providing the clear key places the clear key in a queue located in a hardware system area within the another level of security.

15. The computer system of claim 14, wherein the re-encrypting comprises:
determining whether it is appropriate to remove the clear key from the queue;
based on the determining indicating it is appropriate, removing the clear key from the queue; and
encrypting the clear key under the wrapping key kept inside the another level of security.

16. The computer system of claim 10,
wherein the method further comprises:
based on executing the NQAP instruction, placing a message specified by the NQAP instruction that includes the decipher command and the encrypted cryptographic key to be re-enciphered on a queue in main memory;
based on determining the decipher command is a special command, transferring the message from the queue in main memory to secure storage; and
based on successful execution of one or more validity checks, sending the decipher command to the tamper resistant, high security device to decrypt the encrypted cryptographic key providing the clear key.

17. A method of managing cryptographic keys of a computing environment, the method comprising:
converting an encrypted cryptographic key protected under one level of security to a re-encrypted cryptographic key protected under another level of security, the one level of security provided by a tamper resistant, high security device, and the another level of security including a trust boundary defined by policy, the another level of security having fewer security requirements than the one level of security and including one or more components of the computing environment, the converting comprising:
based on a request by a user application to perform a cryptographic function, obtaining by a processor of the computing environment, the encrypted cryptographic key encrypted under the one level of security using a master key internal to the one level of security, the processor coupled to the tamper resistant, high security device;
executing, by the processor, transparent to the user application, an enqueue adjunct processor queue (NQAP) instruction to re-encipher the encrypted cryptographic key, the NQAP instruction to provide the encrypted cryptographic key to be re-encrypted, a decipher command to be performed, and an indicator indicating that the decipher command to be performed is a special command;
based on executing the NQAP instruction, obtaining the encrypted cryptographic key in the clear as a clear key, the clear key placed in secure memory observable by the another level of security and not observable outside of the another level of security; and
re-encrypting, by the processor, the clear key using a wrapping key kept inside the another level of security to provide an encrypted key to be used in the cryptographic function.

18. The method of claim 17, wherein the tamper resistant, high security device comprises a cryptographic device coupled to the processor, and the method further comprises:
based on executing the NQAP instruction, sending the decipher command to the cryptographic device;
based on receiving the decipher command, decrypting by the cryptographic device the encrypted cryptographic key to produce the clear key; and
providing by the cryptographic device the clear key to the processor, wherein the clear key is secure within the another level of security.

19. The method of claim 18, wherein the providing the clear key places the clear key in a queue located in a hardware system area within the another level of security, and wherein the re-encrypting comprises:
determining whether it is appropriate to remove the clear key from the queue;
based on the determining indicating it is appropriate, removing the clear key from the queue; and
encrypting the clear key under the wrapping key kept inside the another level of security.

* * * * *